(12) United States Patent
Brück et al.

(10) Patent No.: US 7,438,867 B2
(45) Date of Patent: Oct. 21, 2008

(54) HONEYCOMB BODY HAVING A SPRING/DAMPER SYSTEM AND METHOD FOR PRODUCING THE HONEYCOMB BODY

(75) Inventors: Rolf Brück, Bergisch Gladbach (DE); Jörg-Roman Konieczny, Siegburg (DE); Lorenzo Pace, Lohmar-Heide (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 752 days.

(21) Appl. No.: 10/762,151

(22) Filed: Jan. 20, 2004

(65) Prior Publication Data
US 2004/0152594 A1  Aug. 5, 2004

Related U.S. Application Data

(63) Continuation of application No. PCT/EP02/08001, filed on Jul. 18, 2002.

(30) Foreign Application Priority Data

Jul. 19, 2001 (DE) ................ 101 34 416
Oct. 18, 2001 (DE) ................ 101 51 494

(51) Int. Cl.
*B01D 50/00* (2006.01)
*B01D 53/34* (2006.01)
*B01J 8/02* (2006.01)
*B01J 35/02* (2006.01)

(52) U.S. Cl. ............... 422/180; 422/179; 422/211; 422/221; 422/222

(58) Field of Classification Search ............... 422/174, 422/179, 180, 221, 222; 60/300, 299; 502/439, 502/527; 428/116
See application file for complete search history.

(56) References Cited

U.S. PATENT DOCUMENTS

| | | | |
|---|---|---|---|
| 4,818,746 A | 4/1989 | Cyron | 502/439 |
| 5,079,210 A | 1/1992 | Kaji et al. | 502/439 |
| 5,157,010 A | 10/1992 | Maus et al. | 502/439 |

(Continued)

FOREIGN PATENT DOCUMENTS

DE  24 22 110 A1  11/1975

(Continued)

*Primary Examiner*—Alexa D Neckel
*Assistant Examiner*—Matthew J Merkling
(74) *Attorney, Agent, or Firm*—Laurence A. Greenberg; Werner H. Stemer; Ralph E. Locher (57) ABSTRACT

A honeycomb body, particularly a catalyst carrier body that serves to clean an exhaust gas of an internal combustion engine, includes a honeycomb structure joined to a casing tube by a joining techniques. The honeycomb structure is at least partially surrounded by an inner sleeve and at least partially by an outer sleeve. The inner sleeve and the outer sleeve are placed in an axial section between the casing tube and the honeycomb structure. The adjacently disposed components are joined to one another by a plurality of joining locations, and an open spring-damper system is formed by at least one sleeve. A long-life system for fixing a honeycomb structure in a casing tube is thus provided which permits thermal compensating expansions and distinctly reduces the tendency of the honeycomb structure to vibrate with regard to the casing tube. A method for producing such a honeycomb body is also provided.

31 Claims, 6 Drawing Sheets

U.S. PATENT DOCUMENTS

| | | | | |
|---|---|---|---|---|
| 5,272,875 | A | 12/1993 | Kaji | 60/299 |
| 5,482,686 | A * | 1/1996 | Lebold et al. | 422/179 |
| 5,486,338 | A * | 1/1996 | Ota et al. | 422/179 |
| 5,795,658 | A | 8/1998 | Bode et al. | 428/593 |
| 5,902,558 | A | 5/1999 | Maus et al. | 422/181 |
| 6,040,064 | A | 3/2000 | Brück et al. | 428/593 |
| 6,286,353 | B1 | 9/2001 | Brück | 72/187 |
| 6,497,039 | B1 | 12/2002 | Wieres et al. | 29/890 |
| 6,634,542 | B1 | 10/2003 | Wieres | 228/175 |
| 6,780,805 | B2 * | 8/2004 | Faber et al. | 502/66 |
| 2001/0036427 | A1 * | 11/2001 | Yamada et al. | 422/179 |

FOREIGN PATENT DOCUMENTS

| | | |
|---|---|---|
| DE | 38 17 490 A1 | 11/1989 |
| DE | 38 33 675 A1 | 4/1990 |
| DE | 195 01 360 A1 | 8/1996 |
| EP | 0 220 468 B1 | 5/1987 |
| EP | 0 454 712 B1 | 11/1991 |
| EP | 0 784 507 B1 | 7/1997 |
| EP | 0 938 380 B1 | 9/1999 |
| JP | 06039295 | 2/1994 |
| WO | WO 9715393 A1 * | 5/1997 |
| WO | 98/15724 | 4/1998 |
| WO | 99/37432 | 7/1999 |

* cited by examiner

HONEYCOMB BODY HAVING A SPRING/DAMPER SYSTEM AND METHOD FOR PRODUCING THE HONEYCOMB BODY

CROSS-REFERENCE TO RELATED APPLICATION

This application is a continuation of copending International Application No. PCT/EP02/08001, filed Jul. 18, 2002, which designated the United States.

BACKGROUND OF THE INVENTION

Field of the Invention

The invention relates to a honeycomb body and to a method for producing a honeycomb body, in particular a catalyst carrier body for purifying an exhaust gas of an internal combustion engine. The honeycomb body has a honeycomb structure which is connected by technical joining to a casing tube. Such honeycomb bodies are preferably used in motor vehicle construction.

Given the fact that the honeycomb structure and the casing tube usually are formed of different materials, and at least have different material thicknesses, an unequal thermal expansion occurs when the honeycomb body is subjected to thermal stress (for example, when hot exhaust gas flows through it). That leads to a relative movement of the honeycomb structure with respect to the casing tube in the axial and the radial direction as well as in the circumferential direction. Consequently, in order to operate a honeycomb body of that type as a catalyst carrier body in an exhaust system of an internal combustion engine, it is necessary to ensure that the fastening of the honeycomb structure to the casing tube is configured in such a way that such fastening can absorb or compensate relative movement.

In the course of recent developments, honeycomb bodies were first proposed which are not connected to the casing tube over the entire axial length of the honeycomb structure. That made it possible to have a different thermal expansion behavior in the axial direction. With a view toward the relative movements in the circumferential direction of the honeycomb structure or in the radial direction with respect to the casing tube, thin sleeves were proposed which at least partially surround the honeycomb structure and are connected at different locations to the honeycomb structure, on one hand, and to the casing tube, on the other hand. Sleeves of that type are additionally provided with slots or the like, so that the different dimensions of the circumference of the honeycomb structure can be compensated in the event of thermal stress.

Tests showed, however, that known systems can sometimes not ensure a permanent fixing of the honeycomb structure in the casing tube. Particularly with regard to structures with sleeves, material fatigue and/or a breakaway of the sleeve from the casing tube or the honeycomb structure could occasionally be detected at a relatively early stage.

A further configuration for the compensation of thermal expansions of the honeycomb structure is known from German Published, Non-Prosecuted Patent Application DE 38 33 675 A1. It is proposed, there, to place between the honeycomb structure and the casing tube an enveloping band which is formed of two metal bands welded to one another. The connection of the metal bands in that case is provided in such a way as to give rise to cushion-like cavities which are intended to absorb a variation in the gap width between honeycomb structure and casing tube. In order to produce such an enveloping band, two smooth metal bands are laid flat one over the other and connected through the use of intersecting weld seams. During a subsequent brazing process for making connections between the honeycomb structure, the enveloping band and the casing tube, a widening of the cavities is achieved through the use of a permanent deformation of the two metal bands. Although such a construction with cushion-like cavities is suitable for absorbing the compressive loads occurring during expansion of the honeycomb structure in the radial direction, it was nevertheless not possible for that construction to withstand permanently tensile stresses occurring due to a shrinkage behavior of the honeycomb structure.

SUMMARY OF THE INVENTION

It is accordingly an object of the invention to provide a honeycomb body having a spring/damper system and a method for producing the honeycomb body, which overcome the hereinafore-mentioned disadvantages of the heretofore-known devices and methods of this general type. More specifically, the object of the present invention is to specify a system for fixing a honeycomb structure in a casing tube in order to form a honeycomb body. The system permanently ensures the tie-up of the honeycomb structure to the casing tube, particularly when a honeycomb body of this type is used in an exhaust system of an internal combustion engine. Furthermore, the method for producing such a honeycomb body ensures a structure with high process reliability in terms of large series manufacture.

With the foregoing and other objects in view there is provided, in accordance with the invention, a honeycomb body, in particular a catalyst carrier body for purifying an exhaust gas of an internal combustion engine. The honeycomb body comprises a casing tube and a honeycomb structure connected to the casing tube by technical joining and defining an axial portion between the casing tube and the honeycomb structure. An inner sleeve at least partially surrounds the honeycomb structure and an outer sleeve at least partially surrounds the honeycomb structure. The inner and outer sleeves are disposed in the axial portion. A plurality of joining locations adjacently interconnect the honeycomb structure, the inner and outer sleeves and the casing tube to form an open spring/damper system from at least one of the sleeves.

In this respect, "open" means that a fluid can flow at least partially through the spring/damper system, that is to say no cushion-like completely closed cavities are formed. Preferably, the sleeves form channel-like passages which, if appropriate, may also be closed at one end. Thus, on one hand, the fluid introduced into the spring/damper system, in particular the hot exhaust gas of an internal combustion engine, ensures a uniform heating of the system. On the other hand, the tie-up of the honeycomb structure to the casing tube is ensured permanently by the open spring/damper system according to the invention.

This means that one or both sleeves have elastic properties, so that a different thermal expansion behavior of the honeycomb structure with respect to the casing tube is compensated. In particular, this elastic property is ensured in that one or both sleeves are capable of being deformed elastically in such a way that a variation in the distance between adjacent joining locations is compensated. This applies, on one hand, in the case of a more rapid expansion in the honeycomb structure in the radial direction, and circumferential direction with respect to the casing tube during a cold-start phase of the internal combustion engine when an increasing exhaust gas temperature leads to the heating of the honeycomb body. On the other hand, this spring/damper system is also suitable for the absorption of tensile stresses in the event of the more rapid shrinkage of the honeycomb structure during the cooling process. The different thermal expansion behavior substantially has its origin in the different specific heat capacities of honeycomb structure and casing tube.

In addition to the elastic property of the spring, the configuration of the sleeves according to the invention has a damping property. What is meant by this is that at least one of the sleeves has a damper or movement decelerator or the two sleeves together act as such a damper. In this case, preferably, frictional effects are utilized, which convert the kinetic energy of the honeycomb body into frictional heat, thus leading to an increased inertia of the honeycomb structure. In particular, the honeycomb structure oscillates to a markedly lesser extent in the case of pressure waves which impinge on to it and occur, for example, in an exhaust system due to the combustion processes in the engine of a motor vehicle. Those frictional effects may consequently be generated between appropriately configured partial regions of a sleeve, or the frictional effects are generated through contact with at least one adjacent component (for example, the adjacent sleeve, the casing tube or the honeycomb structure), so that they slide against one another in the event of a movement relative to one another. Different degrees of damping can be selected and set according to the surfaces in the zone of friction, the external shape, the surface roughness and/or the materials of the sleeves being varied. This embodiment of a damper with sleeves makes it unnecessary, in particular, to use damping mats or the like, and in this case, if appropriate, they may be integrated, at least in partial regions, merely for additional support in the event of a particularly high tendency of the honeycomb structure to oscillate.

This combination of springing and damping properties of this tie-up of the honeycomb structure to the casing tube ensures permanent and stable fixing. Tests of the honeycomb body according to the invention under conditions of use in the motor vehicle sector, such as, for example, during a driving cycle, showed that the damping mechanisms markedly reduce the tendency of the honeycomb structure to oscillate. This applies both in the axial and radial direction as well as in the circumferential direction. The tie-up withstood even a multiplicity of such driving cycles, since the different thermal expansions of honeycomb structure and casing tube occurring in each case were compensated through the springing property. A breakaway of the joining locations or the structural failure of a component (in particular, of the sleeves) is therefore not to be assumed during normal operating conditions in a motor vehicle.

This honeycomb structure embraces, in particular, the honeycomb structures used in motor vehicle construction. This also refers to extruded and ceramic honeycomb structures and, in particular, to metallic honeycomb structures which are coiled, spirally or in an s-shaped manner with one another from corrugated and smooth sheets. With regard to the external shape of a honeycomb body of this type, cylindrical, conical, oval or the like embodiments are also covered. In this connection, the honeycomb structure makes available as large a surface as possible which, in particular, is to be provided with a catalyst. The catalytically active surface serves for the conversion of harmful constituents of the exhaust gas when this exhaust gas flows through the honeycomb structure.

According to the invention, the tie-up of the honeycomb structure takes place through two sleeves which are disposed between the honeycomb structure and the casing tube. In principle, however, it is also possible to use more than two sleeves. Separate sleeve segments which are disposed so as to be distributed on the circumference of the honeycomb structure, are also covered, in particular, when at least one, preferably only the outer, of the sleeves is constructed from 2 to 6 sleeve segments. It may be noted, for explanatory purposes, that in each case two adjacent components may also have a plurality of connection regions which are disposed between them and, in particular, are disposed so as to be distributed on the circumference. It is also conceivable that only one, preferably fully peripheral connection region is formed. In this connection, the expression "joining locations in the radial direction" means that, in order to fasten the honeycomb structure, it is necessary to have a specific plurality of joining locations from the inside outward in the radial direction of the honeycomb body as a function of the number of components (honeycomb structure, plurality of sleeves, casing tube). Thus, conventionally, in the case of n components, (n-1) joining locations are required. The plurality of joining locations thus relates to different types of joining locations which in each case connect different components to one another.

In order to prevent too rigid a tie-up of the components, the plurality of joining locations are oriented in such a way that at most two of the joining locations are disposed one behind the other in the radial direction. This means that the honeycomb body does not have a fully formed connection in any radial direction, and all of the joining locations are disposed directly one behind the other. Starting from the circumference of the honeycomb structure in the radial direction toward the casing tube, the connection, made by the joining locations, of the honeycomb structure to the casing tube is interrupted. In this case, this interruption may, for example, be directly at the circumference toward the inner sleeve, between the sleeves or between the outer sleeve and the casing tube. This refers, in particular, to an axial region of the honeycomb body in which the respectively adjacent joining locations are disposed. This means that, for example, in the case of fastening to the end faces of the honeycomb structure on both sides, the joining locations disposed in each case on the one end face are to be considered. Consequently, in particular, the formation of joining locations which are disposed on the radius of the honeycomb body and bear directly against one another in the radial direction is to be avoided.

According to a further embodiment of the honeycomb body, the inner sleeve and/or the outer sleeve has structures for the compensation of changes in the circumference of the honeycomb structure. Advantageously, the sleeves are to be produced from structured sheet metal foils, the structuring of the sleeves also leading to increased rigidity in the axial direction. This is advantageous particularly with regard to a bending load due to radial expansion or shrinkage of the honeycomb structure. These structures are distinguished, in particular, by a continuous run, so that a substantially uniform spring action over a partial region of the sleeve is ensured. A wavy embodiment, for example, ensures such a structure. In this case, in the event of a relative movement between honeycomb structure and casing tube which is to be compensated, in particular, the structure height changes. A flattening of the structure thus allows a lengthening of the sleeve portions, so that, for example, a moving away of adjacent joining locations due to differential thermal expansion is absorbed. During the cooling of the honeycomb body to an original orientation of the joining locations in relation to one another, the approach of the joining locations is again converted into an increased structure height.

Furthermore, in terms of the implementation of the damping property, it is proposed that the structures of the inner and of the outer sleeve engage in one another in such a way that adjacent structures of the sleeves bear at least partially against one another. The sleeves are connected to one another at inner joining locations, with the sleeves naturally being disposed close to one another. Therefore, in order to generate a zone of friction between the sleeves, it is possible, for example, to place them near to the inner joining location (preferably in an adjacent region up to 1.5 cm, preferably up to 2.5 cm). In this case, the structure height of the structures engaging one into the other can be kept relatively small, so that, in this region, the sleeves cannot move very far away from one another. However, in the event of relatively high dynamic loads, it may also be expedient not to execute the structures as far as the joining locations but, instead, to execute the sleeves without structures near these joining locations. This ensures an improved long-life fastening of the sleeves to the adjacent components. In this case, instead, the structures of the adjacent sleeves engage one into the other in a region between the joining locations. The sleeves may, however, also be provided with a structure, or be executed as such, completely, that is to say over their entire circumference. In order to generate zones of friction in regions further away from the inner joining locations, for example, an appropriately adapted structure height can be used. This may, if appropriate, also mean that the structure height varies between the adjacent inner joining locations. In principle, the structures are constructed in such a way that a frictional force is generated between them which points substantially in the radial direction in order to impede a relative movement of honeycomb structure and casing tube in this direction. In this case, it is appropriate that the structures have, in the region of the zone of friction, partial surfaces which slide one on the other and are likewise disposed substantially in the radial direction.

In this case, it is particularly advantageous that the structures are formed by corrugated sleeves, with the adjacently disposed joining locations of at least 2 structures being spaced apart from one another. In particular, at least 3 or 5 structures are disposed between adjacent joining locations. This also depends on the number of identical joining locations per circumference of the honeycomb structure (as a rule, 3 to 10 identical joining locations distributed over the circumference). An embodiment of the sleeves with at least 2 structures ensures sufficient spring elasticity. Too rigid a tie-on and a correspondingly early failure of the fastening of the honeycomb structure to the casing tube are thus avoided. The configuration of 3 to 5 structures between adjacent joining locations proved particularly advantageous in long-term tests. This number of structures combines a spring/damper system in an extremely compact way, since, on one hand, a sufficient compensation of length changes of the sleeve regions becomes possible and on the other hand, the sides or flanks of the structures of the sleeves bearing against one another form zones of friction, the damping characteristic of which leads to a surprisingly marked stabilization of the honeycomb body system in an exhaust train of an internal combustion engine. A suitable damping property can be established in the case of a structure height of between 1.5 mm and 0.3 mm, with structure heights of 1.1 mm to 0.6 mm being especially advantageous.

According to a further embodiment of the honeycomb body, the inner sleeve is connected, in particular brazed, to the honeycomb structure over the entire circumference of the latter. The inner sleeve then serves as a kind of base for the spring/damper system for fastening the honeycomb structure to the casing tube. Such a base is advantageous, for example, when the honeycomb structure and the sleeve are produced from different materials (for example, ceramic metal), or when the honeycomb structure is not self-supporting, but instead is formed, for example, of a multiplicity of stacked sheet metal layers.

According to yet another embodiment, the honeycomb body has inner joining locations between the inner and the outer sleeve and outer joining locations between the outer sleeve and the casing tube. These several joining locations are in each case disposed so as to be distributed uniformly over the circumference of the honeycomb structure or of the sleeves. The directly adjacent inner and outer joining locations are disposed so as to be offset to one another in the circumferential direction. Such an embodiment of the inner and outer joining locations generates cell-like spaces which serve for an especially uniform absorption of relative movements of the honeycomb structure with respect to the casing tube. In this case, the two sleeves have similar material properties, so that even relatively pronounced relative movements in the radial direction can be compensated uniformly. In this respect, however, it is necessary, furthermore, to ensure that, for example, a sufficient number of zones of friction are formed.

Tests have shown that it is particularly advantageous to provide the inner and/or the outer sleeve with a sleeve thickness which is smaller than 0.3 mm, preferably even smaller than 0.2 mm. The sleeve thickness in this case is in a range which is to be established at approximately between the thickness range of the walls of the honeycomb structure (<0.05 mm) and the thickness of the casing tube (1 to 2 mm). Sleeves of this type may, for example, also be provided with micro-structures and/or influence the structural integrity of the honeycomb structure in a particularly advantageous way. Such sleeves may also be gathered, for example, from European Patent 454 712 B1, corresponding to U.S. Pat. No. 5,157,010 and European Patent EP 784 507 B1, corresponding to U.S. Pat. No. 5,902,558.

According to yet another embodiment, the inner and/or the outer joining locations together have an extent which is less than 30%, particularly even less than 20% and preferably smaller than 15%, of the circumference of the honeycomb structure. This means, for example, that 5 such joining locations with an individual extent in the circumferential direction of 10 mm together result in an extent of 50 mm. In the case of a circumference of the honeycomb structure of approximately 250 mm, the percentage fraction of the joining locations in relation to the circumference is around 20%. The number of identical joining locations and their width must be selected specifically according to the application and varies, in particular, between 3 and 7 identical joining locations with an individual extent of 3 mm to 10 mm (preferably between 3 mm and 6 mm). The joining locations of strip-shaped construction ensure, on one hand, that a construction of the joining locations which has a large area and is consequently possibly also too rigid, is avoided, while a permanent connection of the adjacent components is nevertheless ensured during high thermal and dynamic stresses such as occur, for example, in the exhaust system of an internal combustion engine.

According to a further embodiment, the inner and the outer joining locations are disposed so as to be offset to one another in the axial direction of the honeycomb structure. In addition to an offset of the inner and outer joining locations in the circumferential direction, a situation in which all of the joining locations are disposed so as to bear directly one behind the other in the radial direction of the honeycomb body, is to be avoided. The term "axially offset" means, in this connection, that the joining locations have an extent in the axial direction, and perpendicularly to the axis of the honeycomb body, and that there is no sectional plane in which there is a continuous connection in the radial direction from the honeycomb structure to the casing tube.

According to yet another embodiment, the axial portion has a length which is between 40% and 100% of the dimension of the honeycomb body in the axial direction. A tie-up in only a limited axial portion of the honeycomb structure ensures an axial expansion and contraction of the honeycomb structure independently of the thermal expansion behavior of the casing tube. The configuration of this axial portion in relation to the honeycomb structure in this case is specific to the application.

If, for example, high compressive stresses and only relatively low differential thermal expansions occur, it may be advantageous, starting from one end face of the honeycomb structure, to construct the axial portion with a length of between 10 mm and 40 mm, in particular of between 20 mm and 30 mm. The axial portion in this case is, preferably disposed, when such a honeycomb body is in operation, in such a way that the axial portion is oriented toward the exhaust gas inlet side. The length of the axial portion in this case is limited substantially by the length of the sleeves or the edges of the joining locations or the tie-ups between the inner sleeve and the honeycomb structure. If, for example, the sleeves and/or the joining locations or the tie-up are flush with the end faces of the honeycomb structure, the length of the axial spacing corresponds to the axial length of the honeycomb structure.

In the case of a particularly high thermal stress on the honeycomb body, a barrel-like configuration of the previously cylindrically shaped honeycomb structure sometimes occurs. This barrel-like deformation results, in particular, in a marked shrinkage of the end faces, so that, in this case, it is more advantageous to position the axial region near the middle between the end faces. The tie-up through the use of the spring/damper system then only has to carry out minor compensation operations, and, for example, an unimpeded thermal expansion behavior of the end faces of the honeycomb structure becomes possible.

It is particularly advantageous to form the honeycomb structure with sheet metal layers which are at least partially structured so that they form channels through which an exhaust gas is capable of flowing. The honeycomb structure in this case, has, in particular, a channel density of at least 800 cpsi ("cells per square inch"). The sheets of the sheet metal layers have a sheet thickness which is preferably smaller than 0.025 mm.

According to yet another embodiment, the joining locations and/or the structures of the sleeves are disposed in such a way that an annular gap between the casing tube and the honeycomb structure for an exhaust gas flowing through the honeycomb body is sealed off. This means that a bypass flow past the honeycomb structure during the operation of such a honeycomb body as a catalyst carrier body in the exhaust system of an internal combustion engine is avoided virtually completely. Thus, even future and particularly stringent requirements as to the purity of the exhaust gas emitted into the surroundings can be adhered to.

Further, a honeycomb body is proposed in which at least two inner and/or outer sleeves are provided, which are disposed in each case so as to be spaced apart from one another axially. It is particularly preferred, in this case, to have a configuration with an inner sleeve which extends substantially over the entire extent of the honeycomb structure or its circumference and two outer sleeves that are mounted so as to be spaced apart axially. The reason for such axial spacing is the thermal expansion of the honeycomb structure and/or of the sleeves and/or of the casing tube during the use of such a honeycomb body in the exhaust system of a mobile internal combustion engine (for example, diesel or gasoline engine).

In this case, the flow passes through the honeycomb body in a preferred direction of flow, so that significant temperature gradients arise precisely during the heating-up phase or cold-start phase. This applies not only in the radial direction, but also in the direction of the flow. If, furthermore, the different heat capacities of the individual components are considered, thermal expansions in the axial direction which are different from one another can be established even in the case of a substantially uniformly heated honeycomb body. Since this phenomenon is to be observed to an increased extent in the case of honeycomb bodies or honeycomb structures which become longer, it is appropriate to have an "interrupted" tie-up with sleeves spaced apart axially, particularly with regard to honeycomb structures having an extent of more than 90 mm. Depending on the use of the honeycomb body and/or on the maximum temperatures occurring during use, such a configuration may even be necessary only in the case of extents greater than 120 mm or 150 mm, in order to permanently ensure the structural integrity of the honeycomb body in the exhaust system.

In a further possibility for compensating the axial thermal expansion behavior, at least one inner and/or at least one outer sleeve is provided with at least one microstructure. The microstructures advantageously run substantially in the direction of the circumference of the honeycomb structure and form a kind of "bellows", so that the length of the sleeve in the axial direction can vary. Microstructures of this type may be gathered, for example, from European Patent 454 712 B1, corresponding to U.S. Pat. No. 5,157,010. Further, European Patent EP 784 507 B1, corresponding to U.S. Pat. No. 5,902,558, also describes intersecting microstructures which, on one hand, allow a compensation of the thermal expansions in different or a plurality of directions, but, on the other hand, also permit kink-free shaping in a plurality of directions, so that an undesirable increase in rigidity of the sleeve is compensated or avoided in a simple way in this case.

With the objects of the invention in view, there is also provided a method for producing a honeycomb body, in particular a catalyst carrier body for purifying an exhaust gas of an internal combustion engine. The method comprises producing sleeve blanks, forming inner joining locations between the sleeve blanks, winding the sleeve blanks into at least one inner sleeve and at least one outer sleeve and connecting ends of the sleeve blanks. The at least one inner sleeve and the at least one outer sleeve are introduced into a casing tube. A honeycomb structure is introduced into the inner sleeve. Other joining locations interconnecting the honeycomb structure, the at least one inner sleeve, the at least one outer sleeve and the casing tube are formed to provide an open spring/damper system from at least one of the sleeves.

With regard to the explanation of the term "sleeve blank", it may be noted, at this juncture, that this is intended to refer particularly to metal foils or metal sheets which subsequently also have to be shaped or joined to produce the substantially cylindrical shape of the sleeves. This operation is brought about through the use of the method step of connecting the ends of the sleeve blanks. A production of the sleeves in which a band-shaped material is used as raw material is thus far preferably assumed in this case. The sleeve blanks are generated by being separated from the band-shaped raw material. In this case, it is initially unimportant whether a structure is introduced into these metal foil blanks (before or after separation) or only in the joined-together form as a sleeve. Under some circumstances, it may even be expedient to lead a plurality of band-shaped raw materials simultaneously through a device for generating a (joint, identical) structure. Further particulars as to the method steps listed above are explained in more detail below or, for example, with reference to FIG. 11.

According to a development of the method, at least two sleeve blanks are first jointly calibrated, before the inner joining locations are formed. This means that the two sleeve blanks, which preferably have an identical structure (in particular, with regard to a corrugation height and a corrugation length), are, if possible, oriented very exactly and with their ends flush together, so that the wave crests and the wave troughs of the structures are disposed in alignment. This bundle of sleeve blanks is then led through a calibrating device which has the task of compensating manufacturing tolerances of the device for introducing the structure. In this case, in particular, the corrugation height is reduced, while at the same time a predetermined value can be maintained exactly. Such a calibrating device may also be gathered, for example, from European Patent EP 938 380 B1, corresponding to U.S. Pat. No. 6,286,353. Thereafter, the inner joining locations are formed, with the sleeve blanks being connected rigidly to one another and a relative movement in relation to one another being prevented. The procedure being described herein constitutes a particularly preferred procedure, so that, for example, in the event of the absence of a device for the joint introduction of a structure into a plurality of band-shaped raw materials, if appropriate, a calibration of the individual sleeve blanks may also be carried out.

According to a further embodiment of the method, the formation of the inner joining locations is carried out through the use of a welding method, in particular rolled-seam welding or—laser welding. As is known, a welded joint withstands even high thermal and dynamic loads, such as are to be encountered, for example, in an exhaust system of a mobile internal combustion engine. In this case, however, a further advantage must be mentioned, which is important particularly with regard to the process reliability of the method. Thus, inter alia, the thermal load on the sleeves is relatively limited (spatially) in this joining method. Furthermore, it is possible to dispense with brazing material which may possibly lead to a connection of the two sleeves beyond the desired region of the inner joining locations. This should result in clearly detectable variations in the resilient or springing and/or damping properties of the spring/damper system according to the invention.

Rolled-seam welding is mentioned herein as being particularly preferred. Rolled-seam welding is, in practice, continuous spot-welding according to the resistance pressure welding principle, although this is carried out through the use of roll-shaped electrodes. In contrast to a resistance spot-welding, the electrodes remain in place after the first welding spot is made and continue to rotate. At the locations where a welding spot is to occur, there is a new current flux which results in a fusion of the material at this location. Depending on the rate of feed of the electrodes and on the frequency of the welding current, spot seams or tight seams with overlapping welding locations are produced. A tight seam is likewise generated through the use of continuous direct current.

According to a development of the method, it is also advantageous to carry out the connection of the ends of the sleeve blanks through the use of a welding method, in particular rolled-seam welding or laser welding. In this case, in particular, rolled-seam welding is likewise appropriate, since the sleeve blanks are mostly already disposed in a guide after or during the winding operation, so that a combination with a pressure welding method affords cost and time benefits immediately afterwards. Moreover, the characteristic of the spring/damper system is not markedly impaired when the ends of the sleeve blanks are disposed so as to overlap in order to carry out the rolled-seam welding, since this method nevertheless ensures a permanent connection when all four ends are disposed one above the other and a common connection is to be obtained.

As a result of a development of the method, the outer sleeve, before being introduced into the casing tube, is provided with brazing foil for the formation of outer joining locations.

The use of brazing foil has the advantage that, once again, very exactly delimited joining locations are formed during subsequent thermal treatment. Furthermore, antitwist protection is implemented, since the brazing foil can be oriented exactly according to the configuration of the inner joining locations that are already present. A corresponding brazing of the casing tube would make it necessary, during the insertion of the sleeves, to carry out an operation to adjust the inner and outer joining locations which is simply avoided. With regard to this method step, it may also be noted that, if appropriate, a welding method may also be suitable for forming the outer joining locations, for example when an exact alignment of the inner and outer joining locations can be ensured and the weld seam can be made from the outside (through the casing tube).

According to a further embodiment of the method, the honeycomb structure is provided on its periphery, starting from one end face, with passivation through an offset, before the honeycomb structure is introduced into the inner sleeve. The offset in this case serves, for example, the function of ensuring that, during the brazing of the honeycomb structure, no brazing powder can penetrate between the inner and the outer sleeves, and therefore an undesirable variation in the properties of the spring/damper system is avoided. This is further assisted by a passivation of the periphery of the honeycomb structure from the end face as far as the sleeve or sleeves. The passivation being used may be known lacquers, oils, waxes, coatings or the like which limit the brazing material flow or prevent the accretion of brazing material. Under some circumstances, it is also sufficient if this passivation is disposed only over a partial region of the offset.

According to a concomitant embodiment of the method, the joined-together components are subsequently brought into contact, in particular from one end face, with an adhesive and/or a brazing powder, and thereafter at least one tie-up and/or at least one outer joining location is produced through the use of thermal treatment, in particular a high-temperature vacuum brazing process. This means that the honeycomb structure, which is preferably formed from corrugated and smooth metal sheets, is brazed only when it is located inside the two sleeves and the casing tube. Such a method is described, for example, in International Publication No. WO 99/37432, corresponding to U.S. Pat. Nos. 6,497,039 and 6,634,542. The adhesive or glue is preferably applied on the end face, and in this case it settles in the inner regions of the channels through the use of the capillary effect. The brazing material is subsequently introduced into the channels, for example by the components being dipped into a brazing powder bath and the brazing powder adhering to the adhesive. As a result of thermal treatment, the brazing powder melts and settles on components disposed adjacently or bearing against one another. During cooling, the brazing powder hardens again and makes a connection by joining in this region. In this case, these connections are highly resistant to corrosion and to temperature.

Other features which are considered as characteristic for the invention are set forth in the appended claims.

Although the invention is illustrated and described herein as embodied in a honeycomb body having a spring/damper system and a method for producing the honeycomb body, it is nevertheless not intended to be limited to the details shown.

Various modifications and structural changes may be made in the invention without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
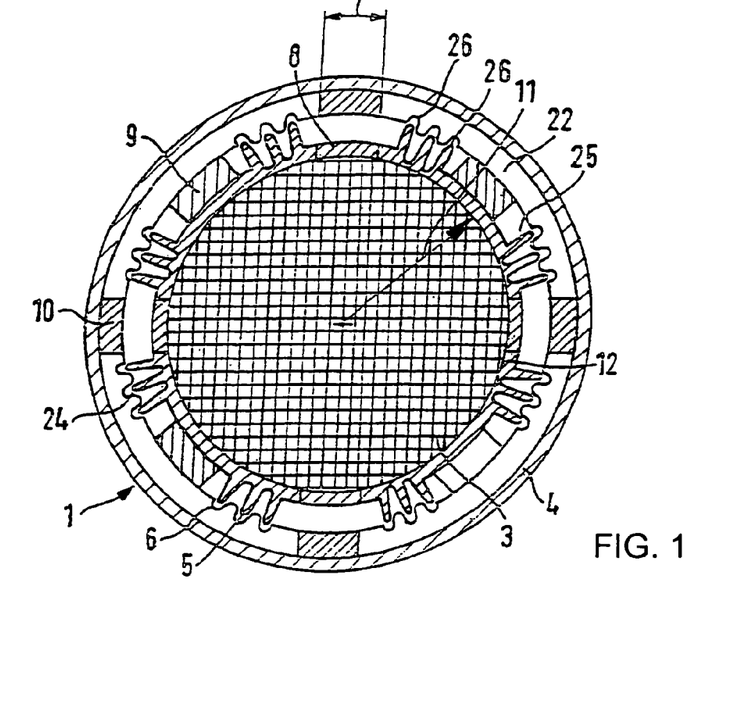
FIG. 1 is a diagrammatic, partly-sectional, end-elevational view of one embodiment of the honeycomb body according to the invention.
Figures 3A, 3B:
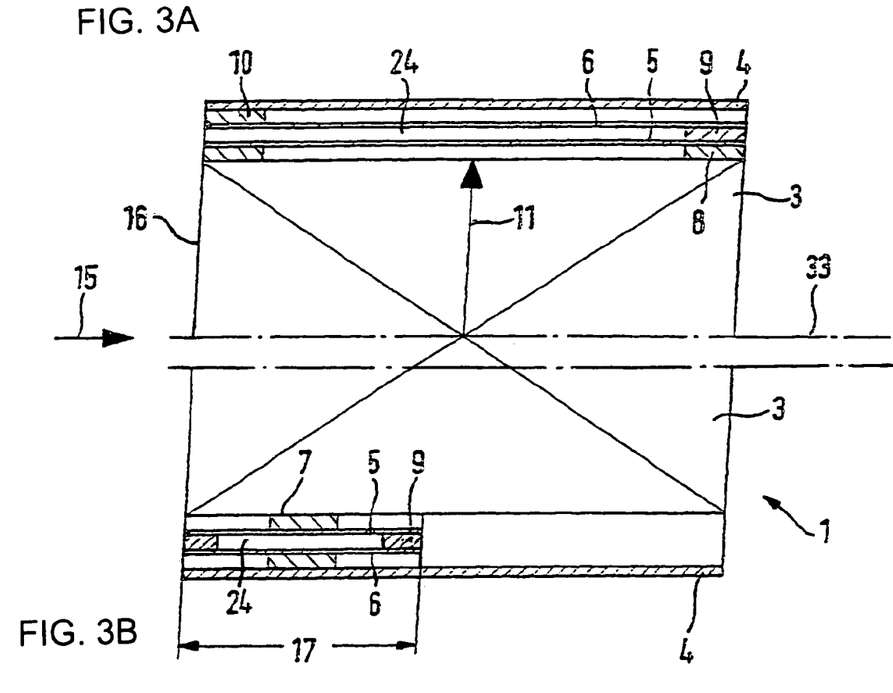
FIGS. 3A and 3B are sectional views of a honeycomb body, in which different embodiments of joining locations are illustrated.
Figure 4:
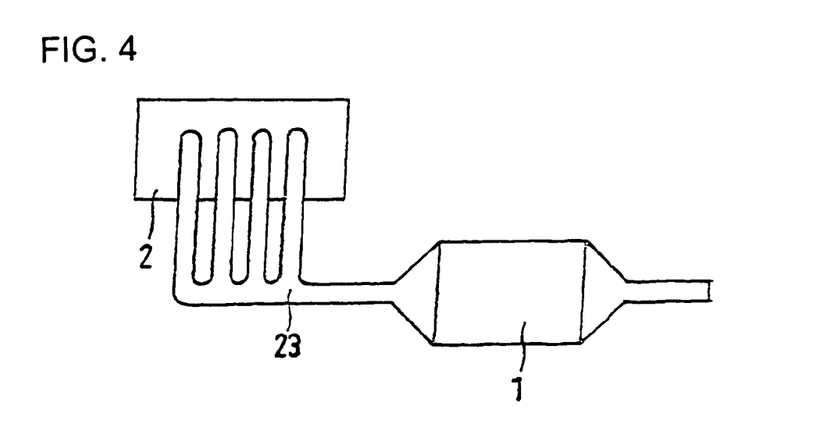
FIG. 4 is an elevational view of an assembly of a mobile emission control system.

Referring now to the figures of the drawings in detail and first, particularly, to FIG. 1 thereof, there is seen a diagrammatic end view of a honeycomb body 1 which is suitable, in particular, as a catalyst carrier body for purifying an exhaust gas of an internal combustion engine 2 (illustrated in FIG. 4). The honeycomb body 1 includes a honeycomb structure 3 which is connected by technical joining to a casing tube 4. The preferred manner of producing the technical joining connection is by brazing. However, a sintering process or even welding may be used as well. The honeycomb structure 3 is surrounded at least partially by an inner sleeve 5 and at least partially by an outer sleeve 6. The inner sleeve 5 and the outer sleeve 6 are disposed in an axial portion 7 (illustrated in FIG. 3) between the casing tube 4 and the honeycomb structure 3. The honeycomb structure 1 is distinguished in that adjacently disposed components (that is, the honeycomb structure 3, the inner sleeve 5, the outer sleeve 6 and the casing tube 4, as seen from the inside outward in radial direction 11) are connected to one another through a plurality of joining locations 8, 9, 10 in such a way that the sleeves 5, 6 form an open spring/damper system 25. The open spring/damper system 25 is formed through the use of structures 26 in the sleeves 5, 6. The structures are disposed between adjacent joining locations 8, 9, 10. At least one of the joining locations 8, 9, 10 and the structures 26 seal-off an annular gap 22 between the casing tube 4 and the honeycomb structure 3 for an exhaust gas flowing through the honeycomb body 1.

In order to avoid too rigid a tie-up from the honeycomb structure 3 to the casing tube 4, at most two of the joining locations 8, 10 are disposed one behind the other in the radial direction. In the illustrated embodiment, the inner sleeve 5 is connected to the honeycomb structure 3 through a joining location 8 providing a tie-up which extends completely over the circumference or periphery 12 of the honeycomb structure 3. Alternatively to this, a plurality of joining locations 8 providing a tie-up of the inner sleeve 5 could be disposed so as to be distributed over the circumference 12 of the honeycomb structure 3.

Figure 2:
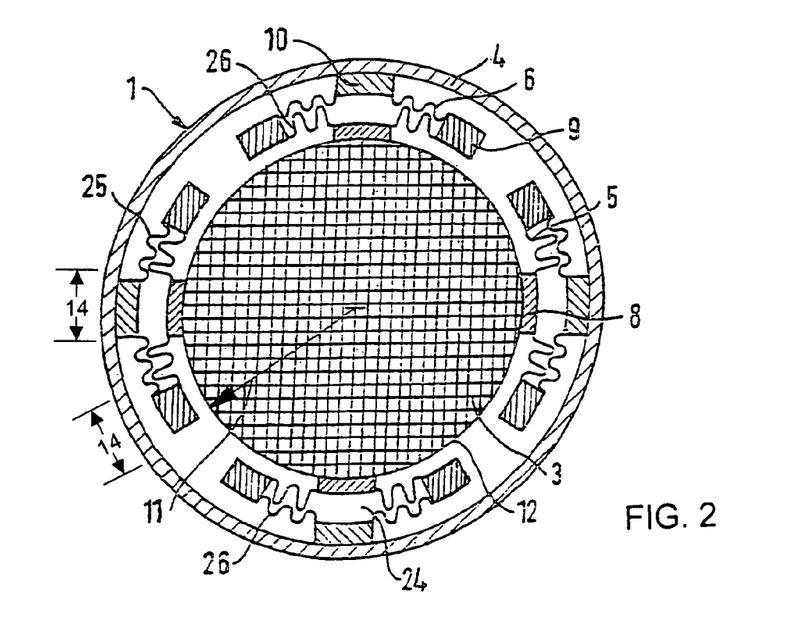
FIG. 2 is an end-elevational view of a further embodiment of the honeycomb body according to the invention.

It may be gathered from FIGS. 1 and 2 that the illustrated embodiments in each case have a plurality of inner joining locations 9 between the inner sleeve 5 and the outer sleeve 6 and a plurality of outer joining locations 10 between the outer sleeve 6 and the casing tube 4. The joining locations are disposed so as to be distributed uniformly over the circumference 12 of the honeycomb structure 3. In this case, the directly adjacent inner joining locations 9 and outer joining locations 10 are disposed so as to be offset to one another in the circumferential direction.

FIG. 1 illustrates an embodiment of the honeycomb body 1 which has two sleeves 5 and 6 that completely surround the honeycomb structure 3. In contrast to this, FIG. 2 shows an embodiment with sleeve segments, so that a plurality of spring/damper systems which are independent of one another are formed. It is also possible to have mixed forms including an inner sleeve 5, fastened over the entire circumference 12 of the honeycomb structure 3, in combination with a plurality of sleeve segments as an outer sleeve 6. The plurality of joining locations in the radial direction 11 forms spaces 24 which result in the positive effect, outlined above, with regard to the useful life of such a honeycomb body 1. The inner joining locations 9 and/or the outer joining locations 10 in this case have an extent 14 in the circumferential direction which is preferably smaller than 8 mm and, in particular, amounts to approximately 5 mm.

FIGS. 3A and 3B diagrammatically show sectional views of two different embodiments of the spring/damper system with regard to the tie-up of a honeycomb structure 3 to a casing tube 4.

The connection illustrated in FIG. 3A includes an inner sleeve 5 and an outer sleeve 6 which are flush with end faces 16 of the honeycomb structure 3. Relatively long levers are thereby generated in an axial direction 15, so that even pronounced relative movements in the radial direction 11 can be compensated, without excessive crumpling or the like of the sleeves 5 and/or 6 being caused. In this case, the honeycomb structure 3 and the inner sleeve 5 are brazed or soldered to one another in the radial direction 11, near the end face 16, by a joining location 8 providing a tie-up. A further connection is formed by the outer joining location 10 between the outer sleeve 6 and the casing tube 4. The honeycomb structure 3 is likewise brazed to the inner sleeve 5 on the opposite end face. An inner joining location 9 has also been formed, directly adjacently thereto, between the inner sleeve 5 and the outer sleeve 6. A connection of the outer sleeve 6 to the casing tube 4 has not been made in this region, so that only the joining location 8 providing a tie-up and the inner joining location 9 are disposed one behind the other in the radial direction 11. In this case, it may also be noted that the channels 19 (illustrated in FIG. 5) in the honeycomb structure 3 extend substantially parallel to an axis 33, so that, starting from one end face 16, an exhaust gas is capable of flowing through the honeycomb structure 3.

FIG. 3B illustrates a further embodiment for fixing the honeycomb structure in the casing tube 4. In this case, the inner sleeve 5 and the outer sleeve 6 are disposed in an axial portion 7 between the casing tube 4 and the honeycomb structure 3. The portion 7, starting from one end face 16 of the honeycomb structure 3, has a length 17 of between 10 mm and 40 mm. In the illustrated embodiment, the inner sleeve 5 and the outer sleeve 6 as well as the inner joining locations 9 form, near the edges of the portion 7, spaces 24 which vary their outer configuration during a relative movement, particularly in the radial direction 11, of the honeycomb structure 3 with respect to the casing tube 4.

FIG. 4 diagrammatically shows the layout of an emission control system, in which an internal combustion engine 4 generates an exhaust gas which is subsequently conducted into an emission control system 23. This emission control system has, for example, a honeycomb body 1 disposed therein which serves as a catalyst carrier body for purifying the exhaust gas. The honeycomb body 1 then has a catalytically active coating, the latter serving for the conversion of pollutants contained in the exhaust gas.

Figure 5:
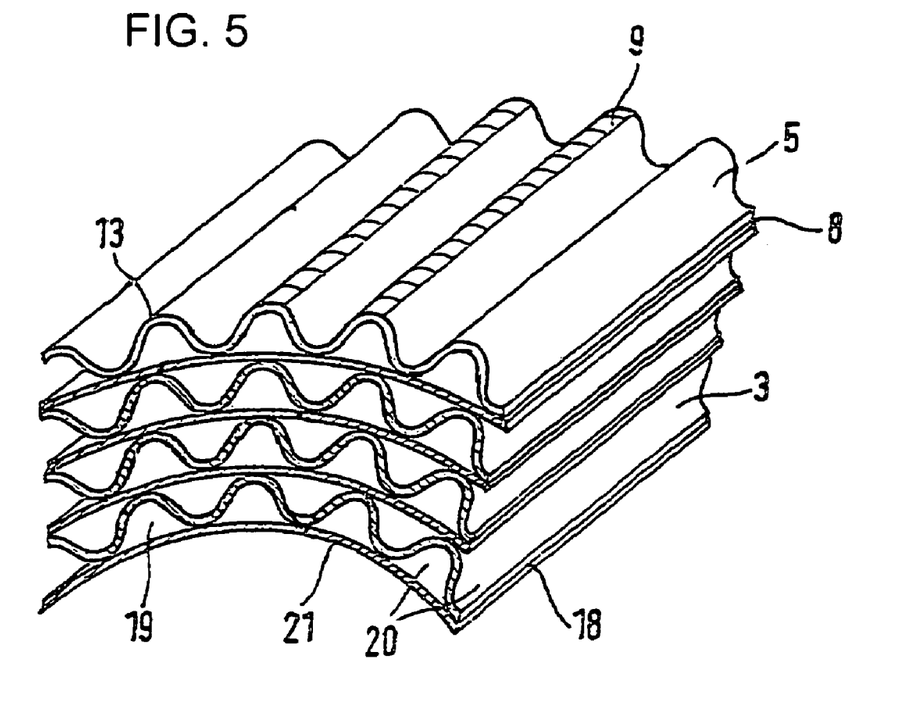
FIG. 5 is a fragmentary, perspective view of an embodiment of a honeycomb structure with a sleeve.

FIG. 5 illustrates a portion of a honeycomb structure 3 with an inner sleeve 5. The honeycomb structure 3 has sheet metal layers 18 which are at least partially structured, so that they form the channels 19 through which an exhaust gas is capable of flowing. The honeycomb structure has a channel density of at least 800 cpsi, in particular more than 1000 cpsi. The sheet metal layers include smooth and corrugated metal sheets 20 with a sheet thickness 21 which is smaller than 0.025 mm.

The illustrated honeycomb structure 3 is connected to the inner sleeve 5 over the entire circumference in a non-illustrated manner through the joining location 8 providing a tie-up. The inner sleeve 5 has a sleeve thickness 13 which is in the range of 0.3 to 0.1 mm. Moreover, a strip-shaped inner joining location 9, which serves for connection to the outer sleeve 6 in a non-illustrated manner, is illustrated on the inner sleeve 5.

Figure 6:
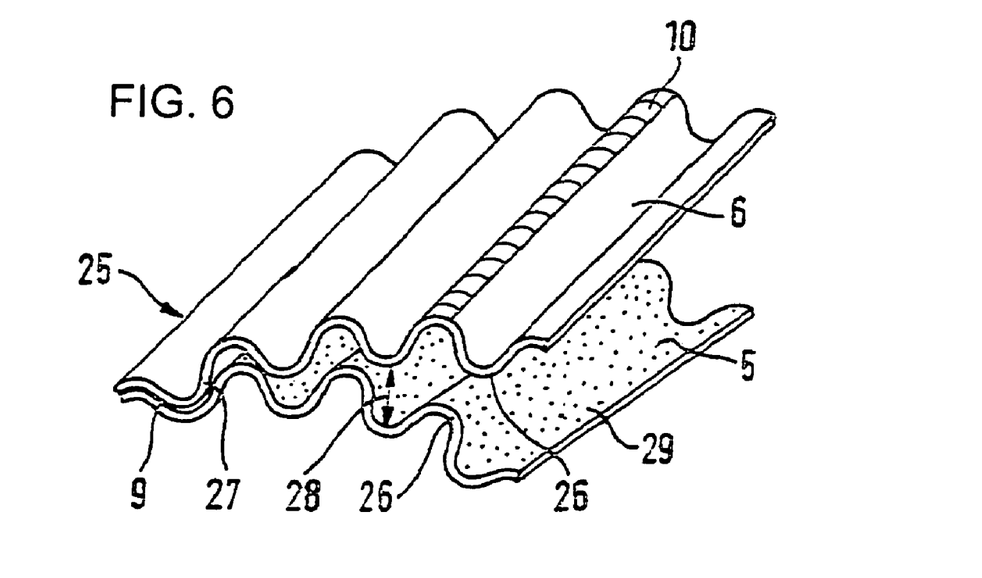
FIG. 6 is a fragmentary, perspective view of an embodiment of a spring/damper system.

FIG. 6 diagrammatically shows a portion of an embodiment of a spring/damper system 25. The inner sleeve 5 and the outer sleeve 6 both have structures 26 for the compensation of changes in the circumference 12 of the honeycomb structure 3 (illustrated in FIG. 1). In the illustrated embodiment, the sleeves 5, 6 are formed of corrugated sheet metal foils, so that the sleeves 5, 6 are constructed completely, and without a gap, from the structures 26. The structures 26 thus also engage one in the other near an inner joining location 9 between the inner sleeve 5 and the outer sleeve 6 in such a way that adjacent structures 26 of the sleeves 5, 6 bear at least partially against one another. In this way, at least one zone of friction 27 is generated, which impedes a relative movement 28 (indicated by a double arrow) of the sleeves 5, 6 in relation to one another. The inner joining location 9 in this case is spaced apart from the adjacently disposed outer joining location 10 through the use of three structures 26 of the outer sleeve 6. In order to ensure exactly dimensioned delimitation of the inner joining locations 9, at least one sleeve is provided, between the adjacently disposed inner joining locations 9, with a passivation 29. The passivation ensures that, in these regions, no brazing agent adheres which may lead, during use, to undesirable variations in the spring and/or damping properties. In particular, what may be referred to as a brazing stop or any coating with similar properties, is appropriate as a passivation.

As may be gathered from this FIG. 6, a leg-like embodiment of the open spring/damper system 25 is also possible. This means that the sleeves 5 and 6 only have a segment-like construction with an inner sleeve segment extending substantially only from the non-illustrated joining location 8 providing a tie-up as far as an individual inner joining location 9, and an outer sleeve segment extending from the same individual inner joining location 9 toward the outer joining location 10. Consequently, sleeve segments disposed opposite one another in the radial direction 11 (illustrated in FIG. 1) in each case have only a single inner joining location 9 which is preferably constructed to be strip-shaped in the axial direction of the honeycomb body 1 (illustrated in FIGS. 1, 2, 3A and 3B). The result of this is that the open spring/damper system 25 is opened not only in the axial direction but also in a circumferential direction. The function of the spring/damper system 25 is ensured in that at least one leg (sleeve segments) has a structure 26 and can thus compensate relative movements of the joining locations 8, 9, 10 in relation to one another. Furthermore, oscillations are damped in that the adjacent legs slide on one another during opening and closing (zone of friction 27), with the kinetic energy being converted at least partially into frictional heat.

Figure 7:
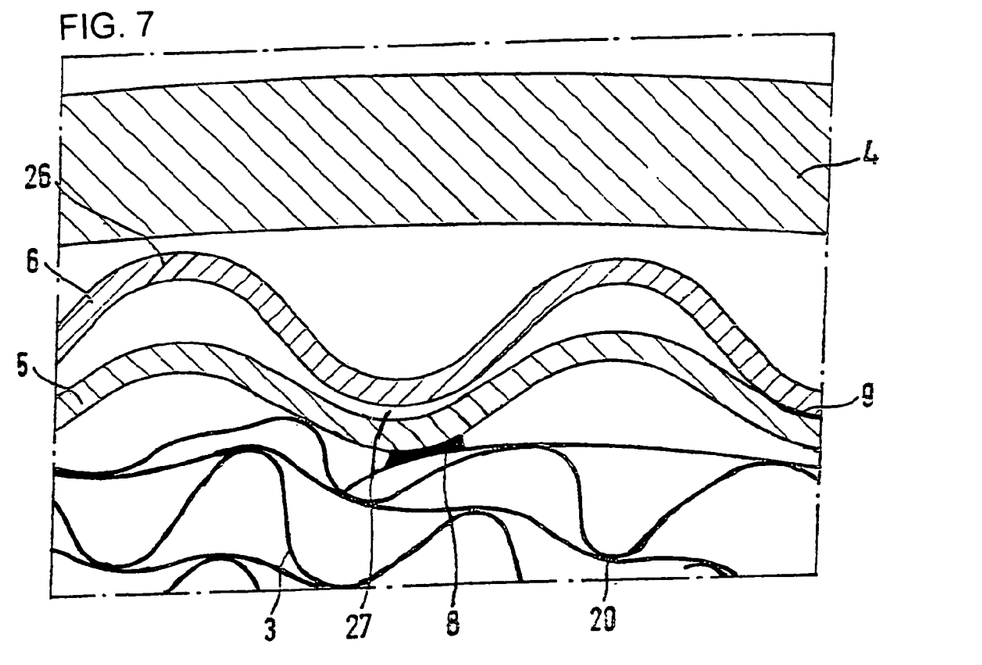
FIG. 7 is a drawing of a photograph of an embodiment of inner and outer sleeves.

FIG. 7 is a fragmentary drawing of a photograph of an embodiment of the inner sleeve 5 and the outer sleeve 6. In the upper region of the photograph, it is possible to see the casing tube 4 which is constructed to be thickened with respect to the smooth and corrugated metal sheets 20 forming the honeycomb structure 3. The inner sleeve 5 and the outer sleeve 6 in this case have identical material thicknesses which lie between those of the casing tube 4 and the sheets 20. Both sleeves have a structure 26. The inner sleeve 5 is brazed to the honeycomb structure 3 in the region of the joining location 8 providing a tie-up. The inner joining location 9 can be seen in the right-hand portion of the image. In the illustrated region of the honeycomb body 1, the outer sleeve 6 is spaced apart from the casing tube 4, so that radial thermal expansion of the honeycomb structure 3 is ensured during use. The structures 26 near the inner joining location 9 form a zone of friction 27 which allows the desired damping properties of the system.

Figure 8:
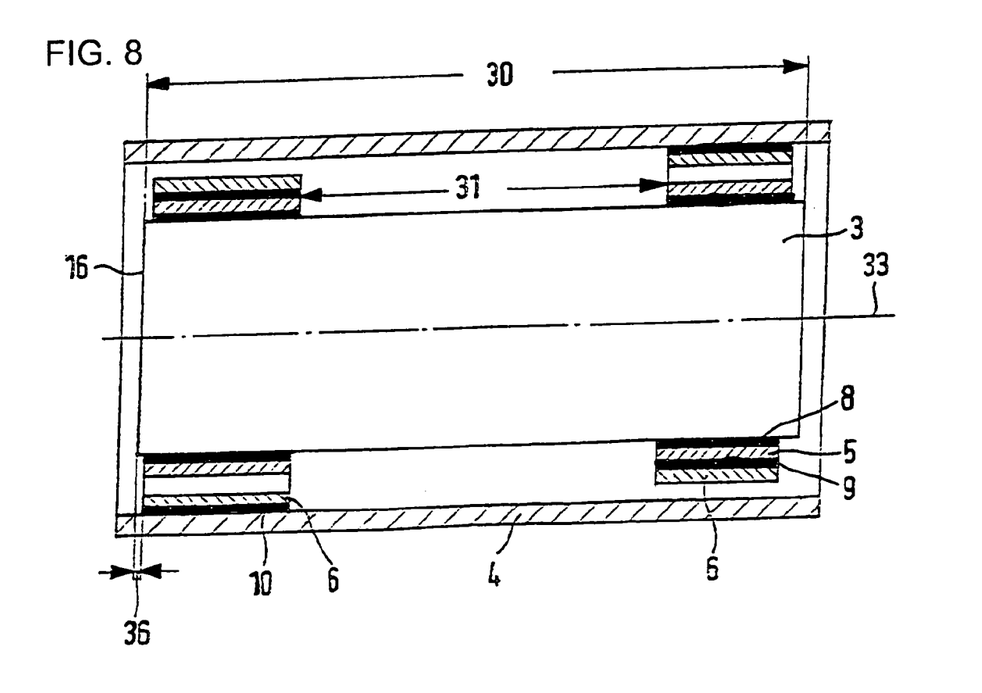
FIG. 8 is a sectional view of a honeycomb body, illustrating an embodiment with sleeves spaced apart axially.

FIG. 8 illustrates a sectional view of a honeycomb body with sleeves spaced apart axially. In the honeycomb body 1, two inner sleeves 5 and two outer sleeves 6 are provided and disposed in each case so as to be spaced apart from one another axially. The reason for such axial spacing is the thermal expansion of the honeycomb structure 3 and/or of the sleeves 5/6 and/or of the casing tube 4 during the use of such a honeycomb body 1 in the exhaust system of a mobile internal combustion engine. Since the phenomenon of thermal expansion in the direction of the axis 33 is observed to an increased extent in the case of honeycomb bodies 1 or honeycomb structures 3 becoming longer, such a tie-up with sleeves 5, 6 spaced apart axially is appropriate, particularly in the case of honeycomb structures 3 having an extent 30 of more than 90 mm.

In this case, the sleeves 5, 6 are disposed so as to be offset about the circumference 12 (illustrated in FIG. 1) of the honeycomb structure 3, starting from the end faces 16. This offset 36 is in the range of 3 to 15 mm and, for example, a passivation 26 may be provided in this case. The offset 36 thus has the function of ensuring that, during the brazing of the honeycomb structure 3, no brazing powder can penetrate between the inner sleeve 5 and the outer sleeve 6, and therefore an undesirable variation in the properties of the spring/damper system is avoided.

With regard to the technical joining connections, it may also be explained that the inner sleeve 5 is connected (joining location 8 providing a tie-up) to the honeycomb structure 3 completely over the circumference 12 (illustrated in FIG. 1). An inner joining location 9 and an outer joining location 10 have been illustrated herein diagrammatically in each case on the radially opposite sides. Although the mirror-symmetrical construction of the two sleeves 5, 6 being spaced apart axially is advantageous under some circumstances in terms of providing a thermal expansion which is as unimpeded as possible, axially aligned constructions of the spaced-apart joining locations are nevertheless also occasionally expedient (precisely from points of view relating specifically to manufacture).

Figure 9:
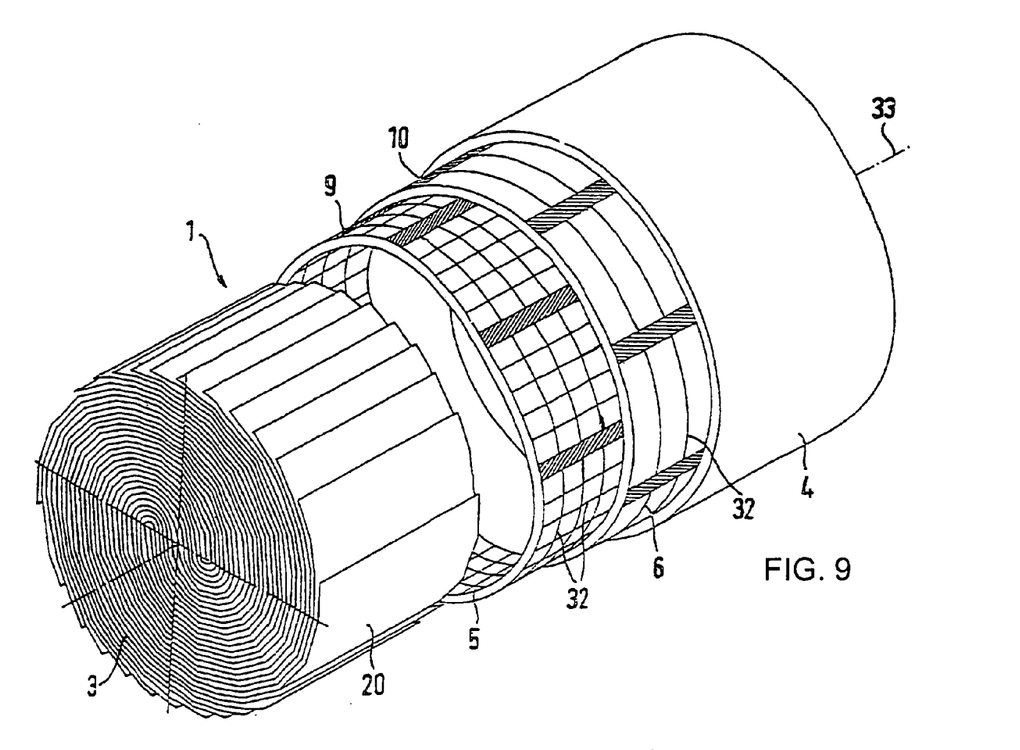
FIG. 9 is an exploded perspective view of a further embodiment of the spring/damper system.

FIG. 9 is an exploded illustration of a further embodiment of the spring/damper system. In this case, the honeycomb body 1 includes, from the inside outward, a honeycomb structure 3 formed by metal sheets 20, an inner sleeve 5, an outer sleeve 6 and a casing tube 4. These components are disposed in this case substantially coaxially to an axis 33. In the illustrated embodiment, the inner sleeve 5 is provided with intersecting microstructures 32. The outer sleeve 6 is provided only with individual microstructures 32 in the direction of the circumference for the compensation of the axial thermal expansion behavior. The number and geometry of the microstructures 32 depend substantially on the conditions of use of the honeycomb body 1.

Figure 10:
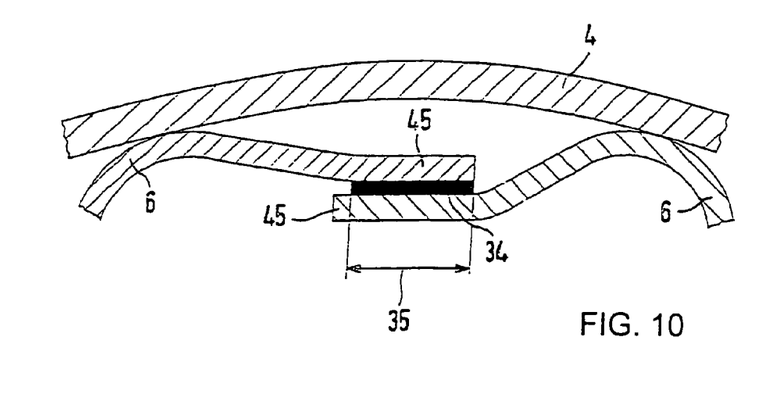
FIG. 10 is an enlarged, fragmentary, perspective view of a sleeve.

FIG. 10 is a fragmentary view of a portion of an outer sleeve 6 which bears against the casing tube 4 and which has been produced from a band-shaped raw material or a sleeve blank. For this purpose, ends 45 of the sleeve blank have been disposed so as to overlap and have been connected to one another through a seam 34. A width 35 of the seam 34 is determined, in particular, by the joining method, for example widths 34 of between 0.5 and 3 mm being possible in the case of the use of rolled-seam welding. In the illustrated embodiment, the ends 45 have no structure 26, and in this case, for example, the latter may be back-formed by virtue of the joining method. Although only the ends 45 of the outer sleeve 6 are shown herein, a similar connection of the ends 45 of the non-illustrated inner sleeve 5 may likewise be made, in which case a non-illustrated inner joining location 9 is preferably formed at the same time.

Figure 11:
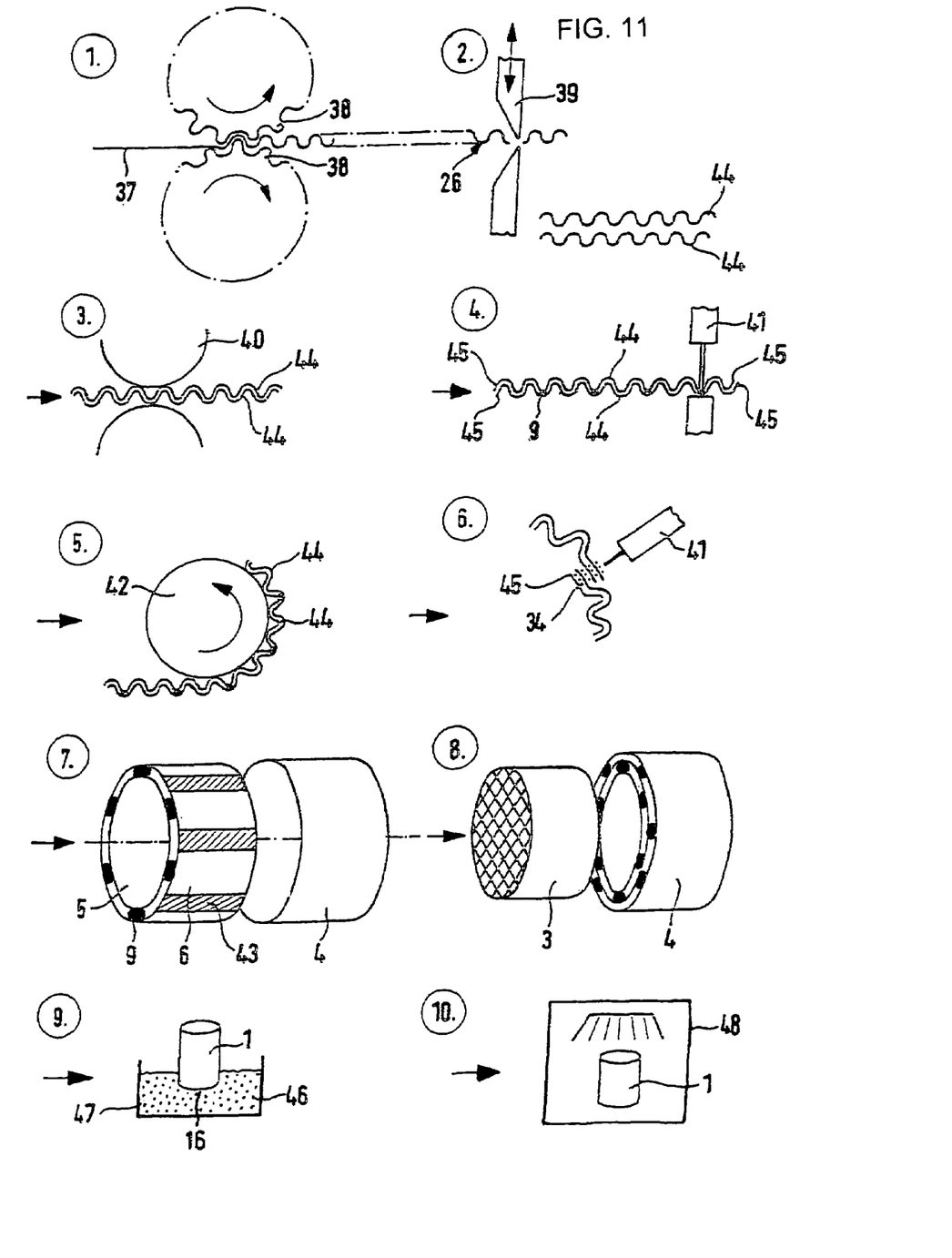
FIG. 11 illustrates a sequence of method steps 1-10 for producing a honeycomb body according to the invention.

FIG. 11 discloses a possible sequence of the method for producing a honeycomb body 1 according to the invention. This method includes the following steps:

production of sleeve blanks 44 (see steps 1 to 3);
formation of the inner joining locations 9 between the sleeve blanks 44 (see step 4);
winding of the sleeve blanks 44 into an inner sleeve 5 and an outer sleeve 6 (see step 5);
connection of the ends 45 of the sleeve blanks 44 (see step 6);
introduction of the at least one inner sleeve 5 and outer sleeve 6 into a casing tube 4 (see step 7);
introduction of a honeycomb structure 3 into the inner sleeve 5 (see step 8); and
formation of joining locations 8, 10 (see steps 9 and 10).

Initially, a structure 26 is introduced into a metal band 37 through the use of two rotating corrugating rollers 38 (step 1) in a known way. Subsequently, this structured band 37 is transported to a cutting device 39, so that sleeve blanks 44 which have the necessary dimensions are separated (step 2). Whereas only one band 37 runs through the corrugating rollers 38 and/or the cutting device 39 in the illustrated case, two bands 37 may also be jointly structured and/or separated, in order to obtain as uniform structures 26 as possible, for the sleeves 5, 6 subsequently to be joined together. Alternatively or in addition thereto, the at least two sleeve blanks 44 are subsequently calibrated (step 3) individually or (as illustrated) jointly in a calibrating device 40, before the inner joining locations 9 are formed (step 4). The formation of the inner joining locations 9 is preferably carried out through the use of a welding method, in particular rolled-seam welding. This operation is carried out through the use of an illustrated welding device 41. The sleeve blanks 44 which are connected to one another by joining are then delivered to a winding station 42, in which the sleeve blanks 44 are shaped (step 5) into an inner sleeve 5 and an outer sleeve 6 that have already been joined together. The connection of the ends 45 of the sleeve blanks 44 again takes place through the use of a welding method, in which the seam 34 is formed by the welding device 41, simultaneously connecting all four ends 45 of the sleeve blanks 44 and in this case also generating a non-illustrated inner joining location 9 (step 6.).

The outer sleeve 6 is then provided on the outside with brazing foil 43 to form the outer joining locations 10 with a casing tube 4 and is introduced into the casing tube 4 (step 7). A honeycomb structure 3 is produced, for example, by the stacking and/or winding of non-illustrated metal sheets 20. A corresponding positioning of the sleeves 5, 6 inside the casing tube 4 is followed by the introduction of the honeycomb structure 3 into the casing tube 4, so that the sleeves 5, 6 are disposed between the honeycomb structure 3 and the casing tube 4 (step 8). Thereafter, the joined-together components 1, 3, 4, 5, 6 are brought into contact, in particular from one end face 16, with an adhesive and/or a brazing material 46 (step 9). For this purpose, the honeycomb body 1 may, for example, be dipped at the end face into a container 47 having the adhesive and/or brazing material 46. In the case of an adhesive, a capillary effect ensures distribution inside the honeycomb body 1 and, in the case of a pulverulent brazing material 46, this is achieved, for example, through the use of a known fluidized bed. Finally, at least one joining location 8 providing a tie-up and/or at least one outer joining location 10 is produced (step 10) through the use of thermal treatment, in particular a high-temperature vacuum brazing process. For this purpose, the honeycomb body 1 is preferably exposed to a reduced atmosphere in a furnace 48.

The present invention describes a spring/damper system with a particularly long useful life, for fixing a honeycomb structure in a casing tube, so that the honeycomb body arising therefrom can be used as a catalyst carrier body in an exhaust system of a mobile internal combustion engine. A markedly improved useful life of such a honeycomb body under these conditions of use is thus established. Furthermore, a method which is also suitable for large series manufacture, for producing such a honeycomb body, is described.

We claim:

1. A honeycomb body, comprising:
a casing tube;
a honeycomb structure connected to said casing tube and defining an axial portion between said casing tube and said honeycomb structure;
an inner sleeve being a sheet metal foil at least partially surrounding said honeycomb structure;
an outer sleeve being a sheet metal foil at least partially surrounding said honeycomb structure;
said inner and outer sleeves being disposed in said axial portion;
said sleeves having structures for compensation of changes in circumference of said honeycomb structure, said structures of said inner sleeve and said structures of said outer sleeve being configured for engaging in one another and adjacent structures of said sleeves being configured for at least partially contacting one another, thereby defining a zone of friction between said inner sleeve and said outer sleeve and impeding a relative movement of said sleeves in relation to one another; and a plurality of joining locations adjacently interconnecting said honeycomb structure, said inner and outer sleeves and said casing tube to form an open spring/damper system from at least one of said sleeves.

2. The honeycomb body according to claim 1, wherein said honeycomb structure is connected to said casing tube by technical joining.

3. The honeycomb body according to claim 1, wherein at least one of said sleeves has structures for compensation of changes in circumference of said honeycomb structure.

4. The honeycomb body according to claim 3, wherein said structures are formed by corrugations in said sleeves, and adjacent joining locations of at least two of said structures are spaced apart from one another.

5. The honeycomb body according to claim 1, wherein said inner sleeve is connected to said honeycomb structure over an entire circumference of said honeycomb structure.

6. The honeycomb body according to claim 1, wherein said inner sleeve is brazed to said honeycomb structure over an entire circumference of said honeycomb structure.

7. The honeycomb body according to claim 1, wherein said plurality of joining locations include inner joining locations between said inner and outer sleeves and outer joining locations between said outer sleeve and said casing tube, being distributed uniformly over a circumference of said honeycomb structure, and directly adjacent inner and outer joining locations are mutually offset in circumferential direction.

8. The honeycomb body according to claim 1, wherein at least one of said inner and outer sleeves has a sleeve thickness smaller than 0.3 mm.

9. The honeycomb body according to claim 1, wherein at least one of said inner and outer sleeves has a sleeve thickness smaller than 0.2 mm.

10. The honeycomb body according to claim 7, wherein at least one of said inner locations together and outer joining locations together have an extent in circumferential direction of less than 30% of a circumference of said honeycomb structure.

11. The honeycomb body according to claim 7, wherein at least one of said inner locations together and outer joining locations together have an extent in circumferential direction of less than 20% of a circumference of said honeycomb structure.

12. The honeycomb body according to claim 7, wherein said inner and outer joining locations are mutually offset in axial direction of said honeycomb structure.

13. The honeycomb body according to claim 1, wherein said axial portion has a length of between 40% and 100% of an axial dimension of the honeycomb body.

14. The honeycomb body according to claim 1, wherein said honeycomb structure has sheet metal layers being at least partially structured to form channels through which an exhaust gas can flow.

15. The honeycomb body according to claim 14, wherein said honeycomb structure has a channel density of at least 800 cpsi, and said sheet metal layers have sheets with a sheet thickness smaller than 0.025 mm.

16. The honeycomb body according to claim 3, wherein at least one of said joining locations and said structures seal-off an annular gap between said casing tube and said honeycomb structure for an exhaust gas flowing through the honeycomb body.

17. The honeycomb body according to claim 1, wherein at least one of said inner sleeve and said outer sleeve is one of at least two mutually axially spaced apart sleeves.

18. The honeycomb body according to claim 1, wherein at least one of said inner sleeve and said outer sleeve has at least one microstructure.

19. A catalyst carrier body, comprising:
a casing tube;
a honeycomb structure for carrying catalytic material for purifying an exhaust gas of an internal combustion engine, said honeycomb structure connected to said casing tube and defining an axial portion between said casing tube and said honeycomb structure;
an inner sleeve being a sheet metal foil at least partially surrounding said honeycomb structure;
an outer sleeve being a sheet metal foil at least partially surrounding said honeycomb structure;
said inner and outer sleeves being disposed in said axial portion;
said sleeves having structures for compensation of changes in circumference of said honeycomb structure, and said structures of said inner sleeve and said structures of said outer sleeve being configured for engaging in one another and adjacent structures of said sleeves being configured for at least partially contacting one another, thereby defining a zone of friction between said inner sleeve and said outer sleeve and impeding a relative movement of said sleeves in relation to one another; and
a plurality of joining locations adjacently interconnecting said honeycomb structure, said inner and outer sleeves and said casing tube to form an open spring/damper system from at least one of said sleeves.

20. A method for producing a honeycomb body according to claim 1, which comprises the following steps:
producing sleeve blanks;
forming inner joining locations between the sleeve blanks;
winding the sleeve blanks into at least one inner sleeve and at least one outer sleeve;
connecting ends of the sleeve blanks;
introducing the at least one inner sleeve and the at least one outer sleeve into a casing tube;
introducing a honeycomb structure into the inner sleeve; and
forming other joining locations interconnecting the honeycomb structure, the at least one inner sleeve, the at least one outer sleeve and the casing tube to form an open spring/damper system from at least one of the sleeves.

21. The method according to claim 20, which further comprises initially jointly calibrating at least two of the sleeve blanks before the step of forming the inner joining locations.

22. The method according to claim 20, which further comprises carrying out the step of forming the inner joining locations with a welding method.

23. The method according to claim 20, which further comprises carrying out the step of forming the inner joining locations with a welding method selected from the group consisting of rolled-seam welding and laser welding.

24. The method according to claim 20, which further comprises carrying out the step of connecting the ends of the sleeve blanks with a welding method.

25. The method according to claim 24, which further comprises selecting the welding method from the group consisting of rolled-seam welding and laser welding.

26. The method according to claim 20, which further comprises providing the at least one outer sleeve with brazing foil, before introducing the at least one outer sleeve into the casing tube, for the formation of outer joining locations.

27. The method according to claim 20, which further comprises providing the periphery of the honeycomb structure with a passivation, starting from one end face, through an offset, before the step of introducing the honeycomb structure into the inner sleeve.

28. The method according to claim 20, which further comprises subsequently bringing the joined-together honeycomb structure, casing tube, at least one inner sleeve and at least one outer sleeve into contact with at least one of an adhesive and a brazing powder, and then producing at least one of at least one tie-up and at least one outer joining location by thermal treatment.

29. The method according to claim 28, which further comprises carrying out the step of bringing the joined-together honeycomb structure, casing tube, at least one inner sleeve and at least one outer sleeve into contact, from one end face of the honeycomb structure.

30. The method according to claim 28, which further comprises carrying out the thermal treatment as a high-temperature vacuum brazing process.

31. A method for producing a catalyst carrier body according to claim 19, which comprises the following steps:
   producing sleeve blanks;
   forming inner joining locations between the sleeve blanks;
   winding the sleeve blanks into at least one inner sleeve and at least one outer sleeve;
   connecting ends of the sleeve blanks;
   introducing the at least one inner sleeve and the at least one outer sleeve into a casing tube;
   introducing a honeycomb structure, for carrying catalytic material for purifying an exhaust gas of an internal combustion engine, into the inner sleeve; and
   forming other joining locations interconnecting the honeycomb structure, the at least one inner sleeve, the at least one outer sleeve and the casing tube to form an open spring/damper system from at least one of the sleeves.

* * * * *